(12) United States Patent
Lin

(10) Patent No.: US 7,007,717 B2
(45) Date of Patent: Mar. 7, 2006

(54) SPINDLE STRUCTURE FOR A CERAMIC FAUCET

(75) Inventor: Shih-Hung Lin, Taichung Export Processing Zone (TW)

(73) Assignee: Globe Union Industrial Corp., Taichung (TW)

( * ) Notice: Subject to any disclaimer, the term of this patent is extended or adjusted under 35 U.S.C. 154(b) by 256 days.

(21) Appl. No.: 10/631,344

(22) Filed: Aug. 1, 2003

(65) Prior Publication Data

US 2005/0022886 A1   Feb. 3, 2005

(51) Int. Cl.
*F16K 11/06* (2006.01)
(52) U.S. Cl. .................. 137/625.41; 251/285
(58) Field of Classification Search ........... 137/625.41; 251/285

See application file for complete search history.

(56) References Cited

U.S. PATENT DOCUMENTS

| | | | | |
|---|---|---|---|---|
| 3,831,621 A | * | 8/1974 | Anthony et al. | 137/270 |
| 3,964,514 A | * | 6/1976 | Manoogian et al. | 137/625.17 |
| 4,387,880 A | * | 6/1983 | Saarisalo et al. | 251/285 |
| 5,094,258 A | * | 3/1992 | Orlandi | 137/454.5 |
| 5,326,075 A | * | 7/1994 | Goff | 251/285 |
| 5,398,717 A | * | 3/1995 | Goncze | 137/270 |
| 5,692,536 A | * | 12/1997 | Tokarz | 137/270 |
| 5,725,010 A | * | 3/1998 | Marty et al. | 137/100 |
| 5,832,952 A | * | 11/1998 | Cook et al. | 137/270 |
| 5,971,359 A | * | 10/1999 | Niakan et al. | 251/288 |
| 6,016,830 A | * | 1/2000 | Niakan et al. | 137/270 |
| 6,170,523 B1 | * | 1/2001 | Chang | 137/625.17 |
| 6,390,128 B1 | * | 5/2002 | Tung | 137/625.17 |
| 6,626,203 B1 | * | 9/2003 | Schneider | 137/270 |
| 6,758,242 B1 | * | 7/2004 | Jones et al. | 137/625.41 |

* cited by examiner

*Primary Examiner*—John Fox
(74) *Attorney, Agent, or Firm*—Leong C. Lei

(57) ABSTRACT

A ceramic spindle for a faucet is disclosed. The spindle has a housing of which the top portion is a protruded edge having teeth to connect with a rotating rim seat having teeth surface. The top face of the rim seat is protruded to form a positioning block and the rotating shaft is a rotating-stop mounting rim of a rotating-stop protruded block. The combination of the protruded block and the rotating rim seat, the range of rotation of the water-distribution disc is controlled. As such, the adjustable control of hot and cold water is achieved. By replacement of the rotating-stop mounting rim on by placing a plurality of the mounting rim onto the rotating shaft, the range of rotating shaft can be changed and thus the ceramic spindle can be easily changed and the pattern of water control can be obtained.

2 Claims, 5 Drawing Sheets

SPINDLE STRUCTURE FOR A CERAMIC FAUCET

BACKGROUND OF THE INVENTION (a) Technical Field of the Invention

The present invention relates to a ceramic spindle for a faucet, and in particular to one used for controlling water flow into cold/hot water tube in a certain proportion to provide the required water temperature. The water after mixed is flowing out through the tube and the water flow rate control mechanism to the shower head.

(b) Description of the Prior Art

FIG. 2 is a conventional spindle body 1 including a housing 10, a rotating shaft module 20, a water-distribution disc 30, a water guiding disc 40 and a cap 50. The bottom section of the housing 10 is open and the top section has a protruded edge having a shaft hole. The two lateral sides at the inner surface of the housing are each provided with a protruded block 101.

The rotating module 20 is mounted within the housing 10 wherein the rotating shaft 21 at the top section passes through the top portion of the housing 10. The two sides of the driving plate 22 at the bottom section are each provided with protruded block 222 and the bottom face is mounted with a plurality of the engaging protruded blocks 221. The top face of the water-distribution disc 30 is provided with three slots 301 which are engageable with the protruded block 221 such that the water-distribution disc 30 is driven to rotate by the driving plate 22. The bottom face of the water-distribution disc 30 is provided with a water-distribution slot 302 so that it urges the top face of the water-guiding plate 40. The water-guiding plate 40 urges the top face of the cap 50 and the similar position of the water-guiding plate 40 and the cap 50 are provided with two inlets 401, 402 and 501, 502 and a water outlet 403, 503. The body of these components after combined is installed within a temperature-control mechanism 2, as shown in FIG. 1. The operation of the combination is described as follows. Cold and hot water via the cold and hot water tubes are respectively guided via the inlets 501, 502 of the cap 50, and via the inlets 401, 402 of the water-guiding disc 40 into the water-distribution slot 302 of the water-distribution disc 30. The cold and hot water is mixed at the water-distribution slot 302 and is then guided via the water outlet 401 of the water-guiding disc 40 and the water outlet 503 of the cap 50 to the water outlet tube. The temperature control of the water is by using the water-distribution slot 301 of the water distribution disc 30, and the water inlet hole and the surface of the water outlet. The conventional spindle employs the protruded block 222 of the driving plate 22 and the protruded block 101 of the housing to achieve the limitation of the rotation of the adjusting button but the engaging components of the ceramic spindle is mounted within the interior of the spindle. The limitation of left and right rotation is a single configuration and cannot be adjusted. Accordingly it is an object of the present invention to provide a ceramic spindle for a faucet, which overcomes the above drawback.

SUMMARY OF THE INVENTION

Accordingly, it is an object of the present invention to provide a ceramic spindle for a faucet comprising a housing, a rotating shaft module, a water-distribution disc and a water-guiding disc. The ceramic spindle is characterized in that the top portion of the housing is mounted onto a rotating rim seat and on the rotating shaft of the shaft module a mounting rim is fitted so that the combination of the mounting rim and the rotating rim seat can restrict the limit of the left and right rotation.

Yet another object of the present invention is to provide a ceramic spindle for a faucet, wherein a stop component is mounted at the exterior of the housing, and therefore any of the stop component can be replaced easily.

A further object of the present invention is to provide a ceramic spindle for a faucet, wherein the ceramic spindle can be fitted to any type of faucets.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
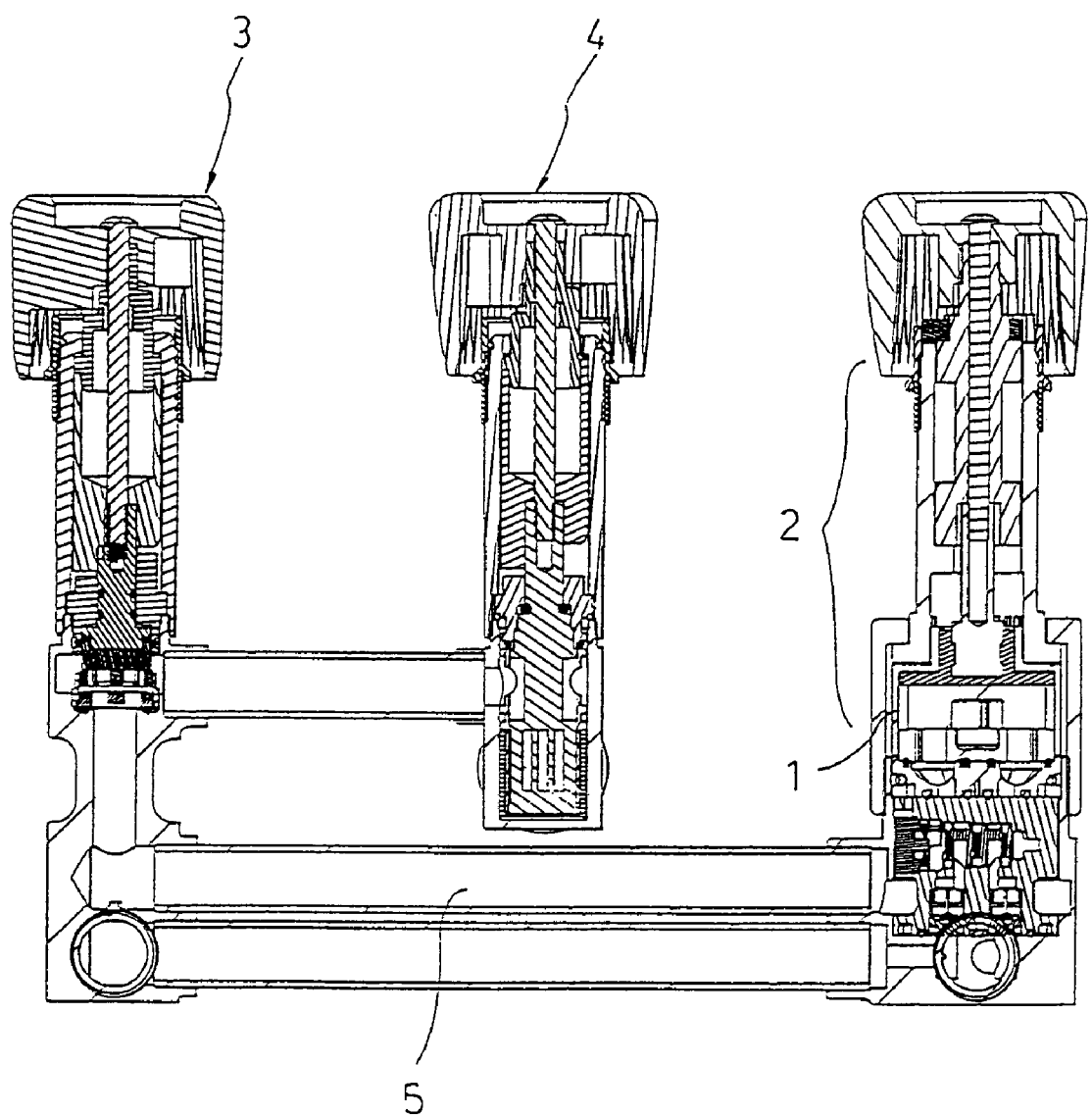
FIG. 1 is a sectional view of a ceramic spindle for a faucet in accordance with the present invention.
Figure 2:
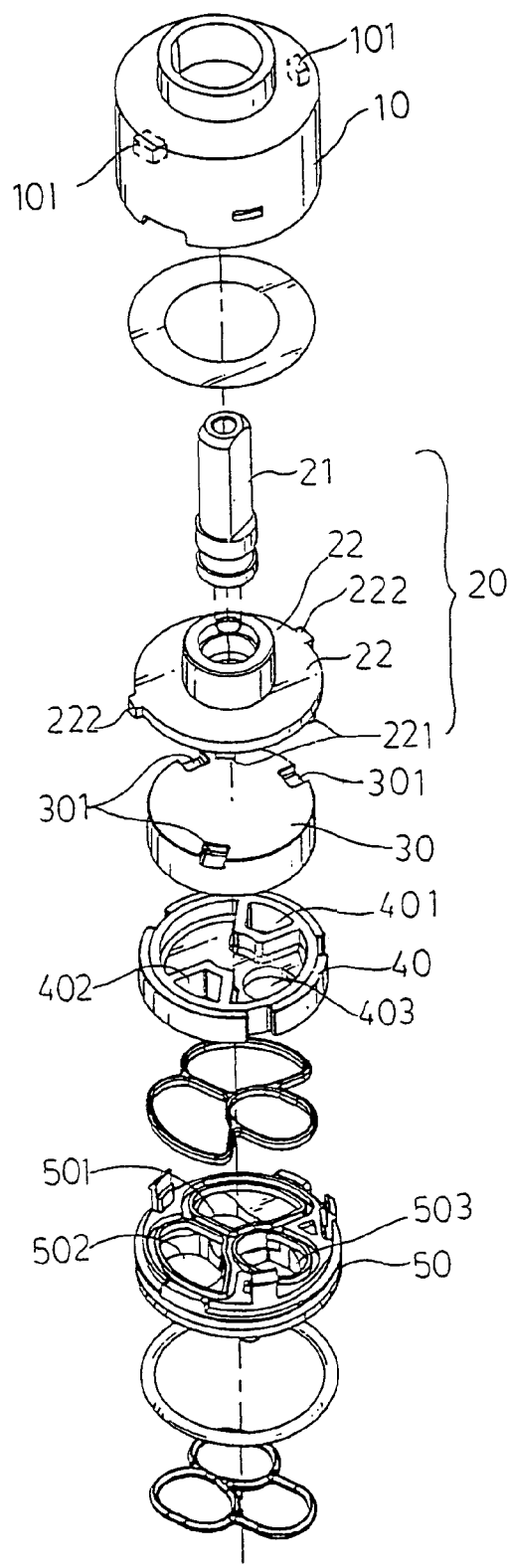
FIG. 2 is an exploded perspective view of a conventional spindle used in a faucet.
Figure 3:
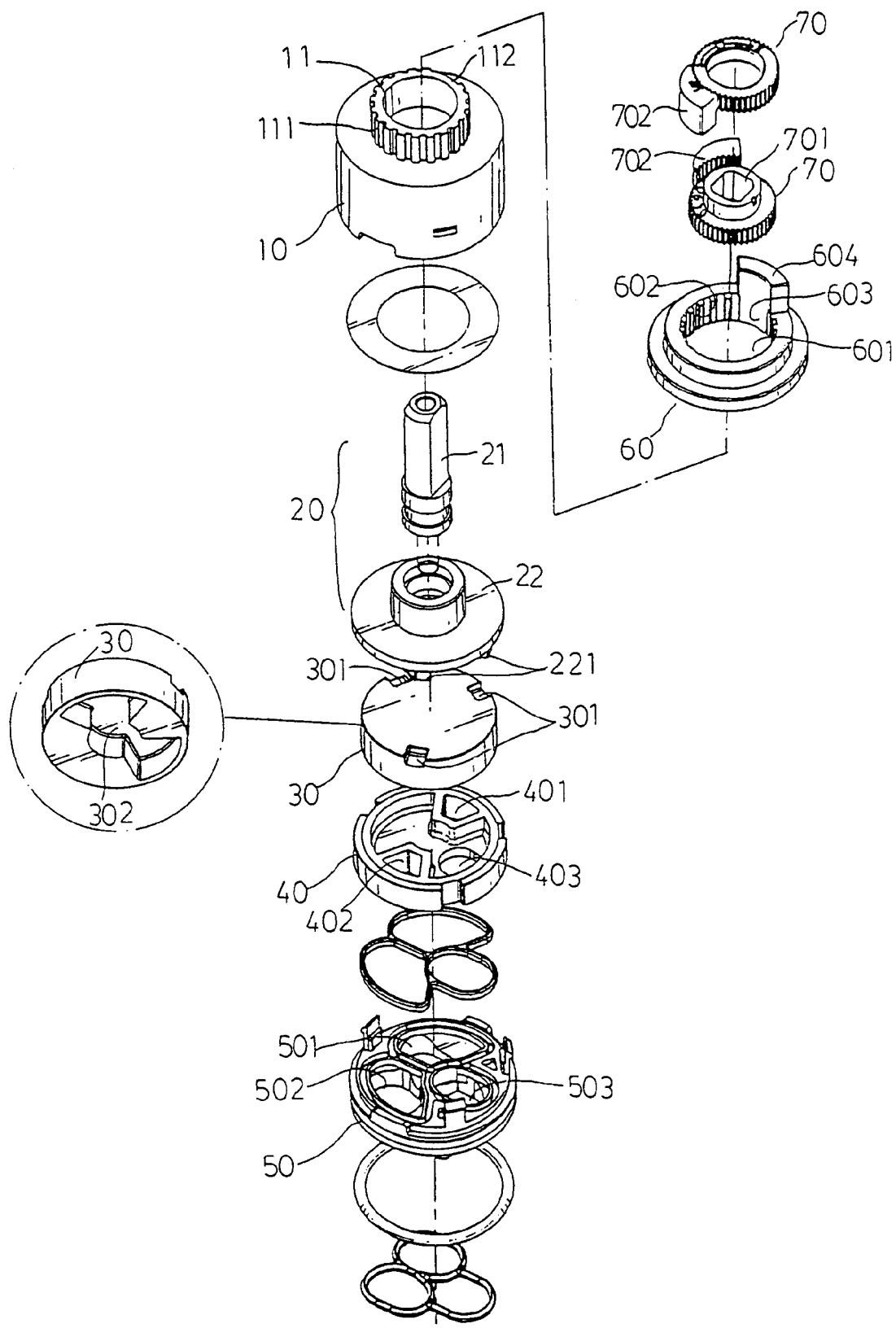
FIG. 3 is a perspective exploded view of the ceramic spindle for a faucet in accordance with the present invention.
Figure 4:
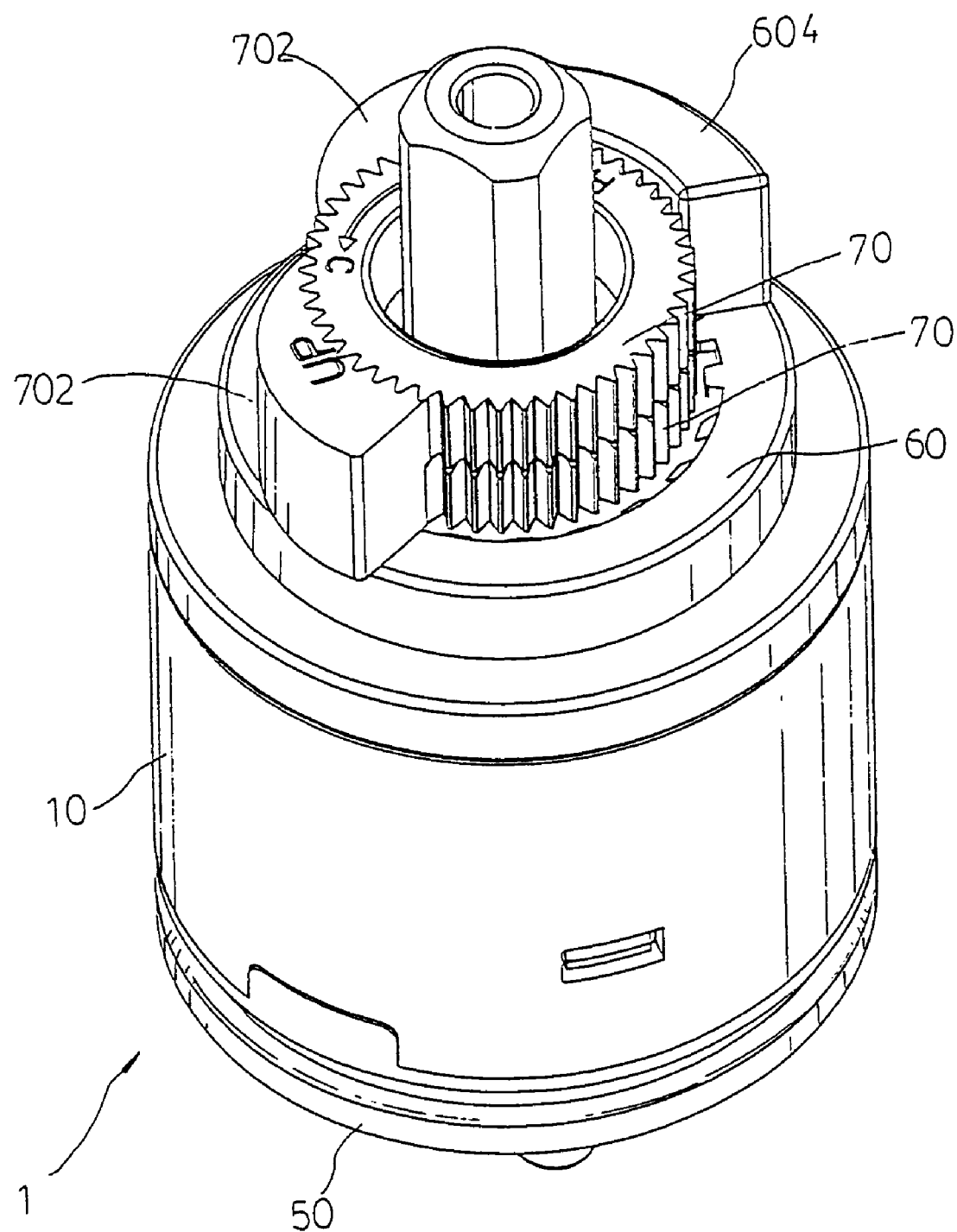
FIG. 4 is a perspective view of the ceramic spindle for a faucet of the present invention.
Figure 5A:
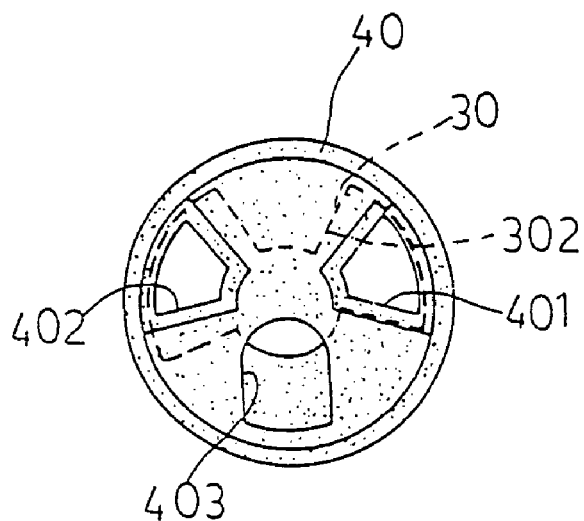
FIGS. 5A and 5B illustrate configurations of a water-distribution disc in accordance with the present invention.
Figure 5B:
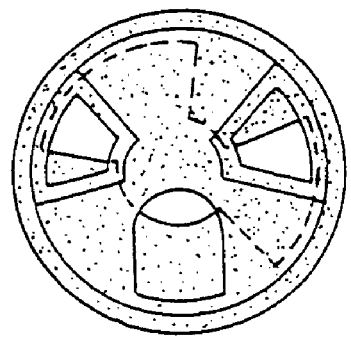

Referring to FIGS. 3 and 4, there is shown a ceramic spindle for a faucet comprising a housing 10, a rotating shaft module 20, a water-distribution disc 30, a water-guiding disc 40 and a cap 50 combined to form the body 1. On the top section of the housing 10 there is a rim seat 60 mounted with a stop rim 70. The bottom section of the housing 10 is open, the top portion of the housing 10 is provided with a rim side having teeth 111 and the center thereof is provided with a protruded edge 11 with a shaft hole. The rotating shaft module 20 includes a rotating shaft 21 fastened to the protruded edge at the center of the top portion of the driving plate 22, which is directly inserted into the housing 10 so that the protruded edge of the driving plate 22 is positioned at the shaft hole of the housing 10, and the rotating shaft 21 passes trough the shaft hole to connect with other component. The bottom face of the driving plate 22 is provided with a plurality of engaging protruded blocks 221. The top face of the water-distribution plate 30 is provided with a plurality of engaging slots 301 so that when the top face of the water-distribution disc 30 and the bottom face of the driving plate 22 approach to each other, the protruded block 221 will be engaged wit the engaging slot 301 and the water-distribution disc 30 will be rotated with the driving plate 22. The bottom face of the water-distribution slot 30 has a butterfly shaped water distribution slot 302 facing the top of the water-guiding disc 40. The corresponding positions of the water-guiding disc 40 and the water-distribution slot 302 are provided with two water inlet holes 401, 402 and a water outlet hole 403. The cap 50, close to the bottom section of the water-guiding disc 40 covers the opening at the bottom section of the housing 10. The top of the caps 5 is provided with water inlet holes 501, 502 and water outlet hole 503 corresponding to the water inlet holes 401 and 402 and the water outlet hole 403 of the water-guiding disc 40 such that when it is positioned into the rotating button mechanism, the water inlet holes 501, 502 are respectively in communication with the cold and hot water tubes, and the water outlet hole 503 is in communication with the water outlet tube. In accordance wit the present invention, the protruded edge 11 at the rim edge having teeth 111 at the top portion of the housing 10 is mounted with the rim seat 60 and a the stop rim 70. As shown in FIG. 3, the rim seat 60 is provided with a mounting hole 601 and teeth 602 are provided at the internal rim face of the mounting hole 601 which are corresponding to the protruded edge 11 of the housing 10 such that the two components can be engaged together. The teeth 111 and 602 are respectively provided with positioning sections 112 and 603 such that the rim seat 60 and the protruded edge 11 can be engaged together to provide a specific connecting position. The top end, at one side of the rim seat 60, is upwardly extended to form a protruded positioning block 604. The stop rim 70 with a shaft hole 701 is mounted onto the rotating shaft 21 so that it can be driven to rotate. The edge face of the stop rim 70 is formed into teeth face which is a gear structure. At one side of the rim edge there is a protruded block 702. By rotating of the rotating shaft 21 and the urging of the positioning block 604 and the protruded block 702, the rotating shaft 21 can be stopped so as to control the left-and-right rotating range of the rotating shaft 21 which drives the water-distribution disc 40 to control the temperature of the water. Further, the rim seat 60 and the stop rim 70 are mounted at the exterior of the body, and a plurality of stop rims can be mounted or the stop rims with various sizes of protruded blocks can be mounted onto the rim seat 60. Hence the limit of the rotating of the rotating shaft 21 can be easily changed so that the cold and hot water inlet hole and outlet hole can be changed and the ceramic spindle can be used or installed onto all kinds of faucets.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A spindle structure for a faucet comprising:
   a housing having a top provided with a rim side provided with teeth;
   a rim seat fined over said rim side of said housing, said rim seat having teeth engaged with said teeth of said housing, said rim seat having an upwardly extending protruded positioning block;
   a first stop rim having teeth and a shaft hole, said stop rim having a side provided wit a protruded block, said first stop rim being mounted on a protruded edge of said housing;
   a rotating shaft module having a driving plate and a rotating shaft, said rotating shaft having a lower end inserted into a center hole of said driving plate and an upper end extending upwardly through a center hole of said housing and said shaft hole of said stop rim, said driving plate having a bottom provided with a plurality of engaging protruded blocks;
   a water distribution disc having a plurality of engaging slots adapted to receive said engaging protruded blocks, said water distribution disc having a bottom formed with a slot;
   a water guiding disc positioned under said water distribution disc and having two first water inlet holes and a first water outlet hole; and
   a cap having two second water inlet holes and a second water outlet bole in communication wit said first water inlet holes and said first water outlet hole.

2. The spindle structure for a faucet as claimed in claim 1, further comprising a second stop rim arranged on said first stop rim.

* * * * *